United States Patent
Park

(10) Patent No.: US 11,028,925 B2
(45) Date of Patent: Jun. 8, 2021

(54) SEAL RING

(71) Applicant: KABUSHIKI KAISHA RIKEN, Tokyo (JP)

(72) Inventor: Namsun Park, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 15/573,740

(22) PCT Filed: Oct. 5, 2016

(86) PCT No.: PCT/JP2016/079621
§ 371 (c)(1),
(2) Date: Nov. 13, 2017

(87) PCT Pub. No.: WO2017/065068
PCT Pub. Date: Apr. 20, 2017

(65) Prior Publication Data
US 2018/0100584 A1  Apr. 12, 2018

(30) Foreign Application Priority Data

Oct. 15, 2015  (JP) .............................. JP2015-203472

(51) Int. Cl.
*F16J 15/28*  (2006.01)
*F16J 15/18*  (2006.01)
(Continued)

(52) U.S. Cl.
CPC .............. *F16J 15/28* (2013.01); *F16J 15/18* (2013.01); *F16J 15/3272* (2013.01); *F16J 15/3408* (2013.01); *F16J 15/3412* (2013.01)

(58) Field of Classification Search
CPC ...... F16J 15/34; F16J 15/3404; F16J 15/3408; F16J 15/3412; F16J 15/3416;
(Continued)

(56) References Cited

U.S. PATENT DOCUMENTS 5,722,665 A * 3/1998 Sedy .................... F16J 15/3412
277/400
9,383,017 B2 * 7/2016 Young .................. F16J 15/3412
(Continued)

FOREIGN PATENT DOCUMENTS

CN  103415730 A1  11/2013
DE  88 14 442 U1   5/1990
(Continued)

OTHER PUBLICATIONS

International Search Report in International Application No. PCT/JP2016/079621, filed Oct. 5, 2017.
(Continued)

*Primary Examiner* — Vishal A Patel
(74) *Attorney, Agent, or Firm* — Saliwanchik, Lloyd & Eisenschenk

(57) ABSTRACT

[Object] To provide a seal ring capable of both reducing a friction loss and reducing oil leakage.
[Solving Means] A seal ring includes: an inner circumferential surface; an outer circumferential surface orthogonal to the inner circumferential surface; side surfaces orthogonal to the inner circumferential surface and the outer circumferential surface; and a plurality of pockets provided, spaced apart from one another in one of the side surfaces. The plurality of pockets each have a symmetrical shape in a circumferential direction and are opened on a side of the inner circumferential surface and closed on a side of the outer circumferential surface. The plurality of pockets each include circumferential end portions that are provided in end portions in the circumferential direction and are R-surfaces each having a convex shape connected to the side surface, a bottom portion provided in a central region in the circumferential direction, and inclined portions each extending between each of the circumferential end portions and the bottom portion. The inclined portions each include at least
(Continued)

one ridge portion, a first inclined portion extending between the bottom portion and the ridge portion and forming a first angle with respect to the side surface, and a second inclined portion extending between the circumferential end portion and the ridge portion and forming a second angle smaller than the first angle with respect to the side surface.

7 Claims, 8 Drawing Sheets

(51) Int. Cl.
   *F16J 15/3272* (2016.01)
   *F16J 15/34* (2006.01)
(58) Field of Classification Search
   CPC .... F16J 15/342; F16J 15/3428; F16J 15/3432; F16J 15/28; F16J 15/18; F16J 15/3272
   See application file for complete search history.

(56) References Cited

U.S. PATENT DOCUMENTS

| | | | | |
|---|---|---|---|---|
| 2005/0263963 | A1* | 12/2005 | Lai | F16J 15/3408 277/399 |
| 2012/0018957 | A1* | 1/2012 | Watanabe | F16J 15/441 277/387 |
| 2012/0280456 | A1* | 11/2012 | Young | F16J 15/3412 277/400 |
| 2014/0008876 | A1 | 1/2014 | Nagai | |
| 2016/0186862 | A1 | 6/2016 | Kondou et al. | |
| 2016/0377181 | A1* | 12/2016 | Baheti | F16J 15/3448 277/387 |
| 2017/0009889 | A1* | 1/2017 | Seki | F16J 15/164 |

FOREIGN PATENT DOCUMENTS

| | | |
|---|---|---|
| JP | 2014-088962 A | 5/2014 |
| JP | 2015-028382 A | 2/2015 |
| WO | WO-2004/090390 A1 | 10/2004 |
| WO | WO-2011/105513 A1 | 1/2011 |
| WO | WO-2011/162283 A1 | 12/2011 |
| WO | WO-2013/094654 A1 | 6/2013 |
| WO | WO-2013/094657 A1 | 6/2013 |
| WO | WO-2015/002143 A1 | 1/2015 |
| WO | WO-2015/045974 A1 | 4/2015 |
| WO | WO-2016/140056 A1 | 9/2016 |

OTHER PUBLICATIONS

Office Action dated Oct. 18, 2018 in Chinese Application No. 201680026102.8.

Office Action dated Mar. 7, 2019 in Korean Application No. 10-2017-7035999, with its English translation.

Supplementary European Search Report dated Jan. 30, 2019 in European Application No. 16855322.0.

* cited by examiner

SEAL RING

CROSS-REFERENCE TO RELATED APPLICATIONS

This application is the U.S. national stage application of International Patent Application No. PCT/JP2016/079621, filed Oct. 5, 2016, which claims priority to Japanese Application No. 2015-203472, filed Oct. 15, 2015, the disclosures of each of which are incorporated herein by reference in their entirety.

TECHNICAL FIELD

The present invention relates to a seal ring that can be used for a hydraulic machine and the like.

BACKGROUND ART

There are known automobiles equipped with various hydraulic machines such as hydraulic-type automatic transmissions. In those automobiles, there is a demand for reduction in drive loss of the hydraulic machines so as to improve fuel efficiency.

Seal rings are used for the hydraulic-type automatic transmissions. The seal ring is fitted into a groove of a shaft inserted into a housing, and seals a gap between the housing and the shaft. During driving of the automatic transmission, a friction loss is caused between that seal ring and the shaft due to its rotation relative to the shaft.

Such a friction loss result in drive loss of the hydraulic machine. Therefore, a technology for reducing the friction loss is desirable. Patent Literatures 1 to 5 have disclosed technologies for reducing the friction loss caused between the seal ring and the shaft. The seal rings disclosed by those literatures each include pockets formed in side surfaces that are contact surfaces with the groove of the shaft.

When oil pressure is applied on that seal ring, oil enters the pocket. The oil entering the pocket adds canceling pressure to lower pressure applied on the groove of the shaft from the seal ring. With this, the friction between the seal ring and the shaft is reduced, and the friction loss caused between the seal ring and the shaft is thus reduced.

CITATION LIST

Patent Literature

Patent Literature 1: WO 2011/105513
Patent Literature 2: WO 2004/090390
Patent Literature 3: WO 2011/162283
Patent Literature 4: WO 2013/094654
Patent Literature 5: WO 2013/094657

DISCLOSURE OF INVENTION

Technical Problem

In the above-mentioned technologies, the oil entering the pocket of the seal ring flows into a gap between the seal ring and the shaft and forms an oil film between the seal ring and the shaft. Such oil film formation enhances a lubrication property of the seal ring, and the friction loss is reduced. However, if the oil film is too thick, the oil easily leaks out of the seal ring. Thus, the relationship between the friction loss and the oil leakage easily becomes a trade-off relationship.

In view of the above-mentioned circumstances, it is an object of the present invention to provide a seal ring capable of both reducing the friction loss and reducing the oil leakage.

Solution to Problem

In order to accomplish the above-mentioned object, a seal ring according to an embodiment of the present invention includes: an inner circumferential surface; an outer circumferential surface orthogonal to the inner circumferential surface; side surfaces orthogonal to the inner circumferential surface and the outer circumferential surface; and a plurality of pockets provided, spaced apart from one another in one of the side surfaces.

The plurality of pockets each have a symmetrical shape in a circumferential direction and are opened on a side of the inner circumferential surface and closed on a side of the outer circumferential surface.

The plurality of pockets each include circumferential end portions that are provided in end portions in the circumferential direction and are R-surfaces each having a convex shape connected to the side surface, a bottom portion provided in a central region in the circumferential direction, and inclined portions each extending between each of the circumferential end portions and the bottom portion. The inclined portions each include at least one ridge portion, a first inclined portion extending between the bottom portion and the ridge portion and forming a first angle with respect to the side surface, and a second inclined portion extending between the circumferential end portion and the ridge portion and forming a second angle smaller than the first angle with respect to the side surface.

In this seal ring, the side surface provided with the pockets functions as a seal surface to a groove of a shaft. Each pocket has the relatively large first angle with respect to the side surface in the first inclined portion. Therefore, each pocket is widely opened on the side of the inner circumferential surface in the first inclined portion. With this, oil easily enters the pocket. Therefore, a sufficient inflow amount of oil into the pocket can be ensured.

Further, the oil entering the pocket flows into the second inclined portion from the first inclined portion. In the pocket, an oil channel having a wedge shape is formed by the second inclined portion. The second angle with respect to the side surface in the second inclined portion is smaller than the first angle. Therefore, when the oil flows into the second inclined portion from the first inclined portion, the reduction of the opening of the oil channel becomes gentle. This makes it easy for oil to flow deeply into the second inclined portion without escaping to the inner circumferential surface of the seal ring. Therefore, the oil pressure applied on the second inclined portion increases.

Moreover, the oil passing the second inclined portion flows into the circumferential end portion. The circumferential end portion is an R-surface having a convex shape. Therefore, the reduction of the opening of the oil channel formed by the circumferential end portion gradually becomes gentle. This makes it easy for oil passing the second inclined portion to flow deeply into the circumferential end portion without escaping to the inner circumferential surface of the seal ring. Therefore, in this seal ring, the oil passing the circumferential end portion forms an adequate oil film on the side surface.

Due to the above-mentioned action, in this seal ring, the friction loss with respect to the shaft is effectively reduced. Further, in this seal ring, each pocket is formed to be symmetrical in the circumferential direction. Therefore, the effect of reducing the friction loss is obtained irrespective of a direction of rotation relative to the shaft. Moreover, in this seal ring, each pocket is closed on the side of the outer circumferential surface. Therefore, the oil entering the pocket hardly leaks toward the outer circumferential surface. Further, each pocket is opened on the side of the inner circumferential surface. Therefore, it is possible to prevent the oil pressure within the pocket from being excessively high. With them, the oil leakage is reduced in this seal ring.

In this manner, this seal ring is capable of both reducing the friction loss and reducing the oil leakage.

The inclined portions may each include the single ridge portion.

The first inclined portion and the second inclined portion may be connected to each other through the ridge portion.

In this configuration, the above-mentioned effect can be obtained by employing the two-step configuration of the first inclined portion and the second inclined portion as the inclined portion.

The ridge portion may be configured as an R-surface having a convex shape.

The plurality of pockets may each further include a connection portion that is an R-surface having a concave shape that connects the bottom portion to the first inclined portion.

In these configurations, the oil within the pocket can more smoothly flow. With this, in this seal ring, the action of reducing the friction loss is promoted.

The bottom portion may be a flat surface parallel to the side surface.

In this seal ring, oil easily enters the pocket at the bottom portion. Therefore, a sufficient inflow amount of oil into the pocket can be ensured. Therefore, the friction loss can be more effectively reduced.

The plurality of pockets may be provided in both the side surfaces.

Irrespective of which of the side surfaces is the seal surface, this seal ring is capable of both reducing the friction loss and reducing the oil leakage. Therefore, in this seal ring, it is unnecessary to take care of the direction of mounting on the shaft, and hence the work efficiency is improved.

The plurality of pockets may be formed to be mutually symmetrical in one of the side surfaces and the other side surface.

In this configuration, the strength of the seal ring increases and the seal ring is hardly deformed. Therefore, in this seal ring, various types of performance such as a sealing property is well maintained.

Advantageous Effects of Invention

It is possible to provide a seal ring capable of both reducing the friction loss and reducing the oil leakage.

MODE(S) FOR CARRYING OUT THE INVENTION

Hereinafter, an embodiment of the present invention will be described with reference to the drawings.

1. Seal Ring 1

Figure 1:
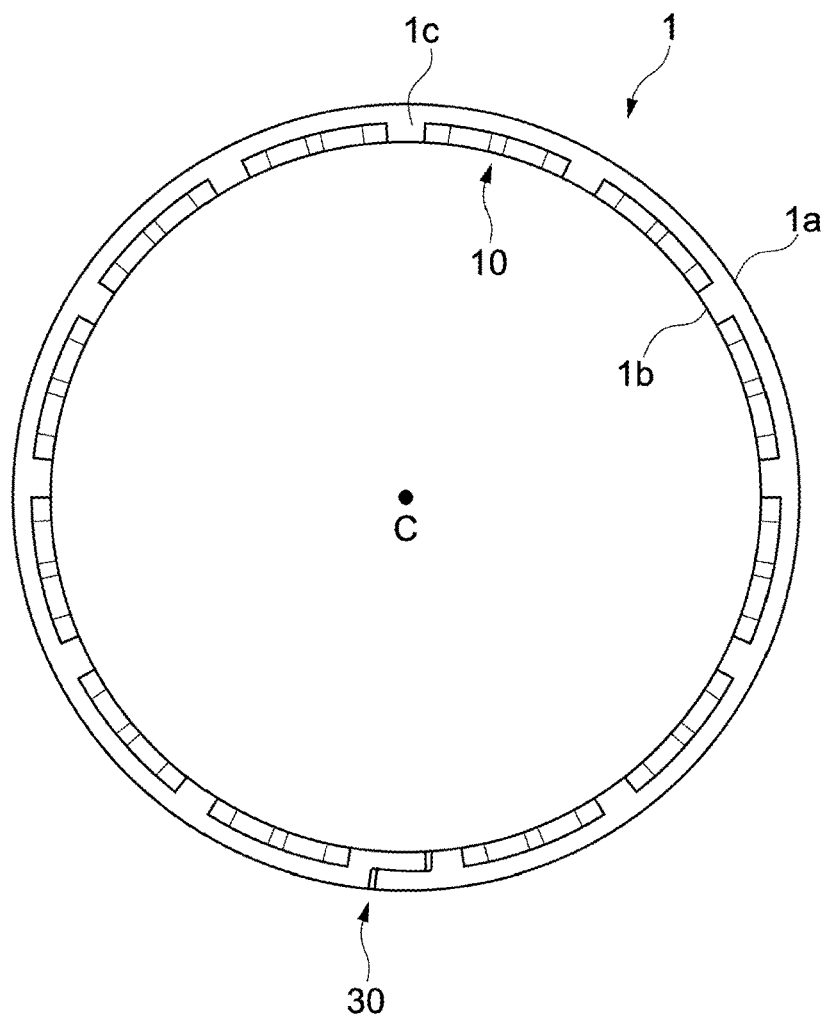
FIG. 1 A plan view of a seal ring according to an embodiment of the present invention.

FIG. 1 is a plan view of a seal ring 1 according to an embodiment of the present invention. The seal ring 1 includes an outer circumferential surface 1a, an inner circumferential surface 1b, and side surfaces 1c. The seal ring 1 is formed in an annular shape having a central axis C as a center. The outer circumferential surface 1a and the inner circumferential surface 1b are cylindrical surfaces each having the central axis C as a center. The side surfaces 1c are flat surfaces orthogonal to the outer circumferential surface 1a and the inner circumferential surface 1b.

The seal ring 1 includes a plurality of pockets 10. The plurality of pockets 10 arranged in the two side surfaces 1c, spaced apart from one another. Each pocket 10 is formed in a concave shape recessed from the side surface 1c. Further, the seal ring 1 is provided with a joint portion 30 in a manner that depends on needs. The joint portion 30 is for facilitating mounting on a shaft. Note that, in the present invention, the shape of the seal ring 1 with the joint portion 30 is defined as one in a state in which the joint portion 30 is closed.

Although not particularly limited, a well-known shape can be employed as the shape of the joint portion 30. For example, a right-angle (straight) joint, a diagonal (angle) joint, stepped (step) joint, a double angle joint, a double cut joint, or a triple stepped joint can be employed as the joint portion 30. In particular, with the double angle joint, the double cut joint, and the triple stepped joint, oil leakage from the joint portion 30 is well reduced.

The seal ring 1 is mounted in the groove of the shaft with the joint portion 30 being expanded. The shaft with the seal ring 1 mounted thereon is inserted into a housing with the outer circumferential surface 1a of the seal ring 1 slightly protruding from the groove. At this time, the outer circumferential surface 1a of the seal ring 1 is brought into contact with an inner circumferential surface of the housing. At the same time, the side surface 1c of the seal ring 1 is brought into contact with the groove of the shaft. Thus, the seal ring 1 seals a gap between the shaft and the housing.

The seal ring 1 is configured such that the pockets 10 are arranged in the groove of the shaft when it is mounted on the shaft and the housing. Therefore, the pockets 10 form spaces between the seal ring 1 and the groove of the shaft. In the seal ring 1, oil pressure of oil flowing into the pockets 10 acts as canceling pressure to lower pressure applied on the groove of the shaft from the side surface 1c. Therefore, the friction between the seal ring 1 and the groove of the shaft is reduced.

A diameter and a thickness $t_0$ (see FIG. 3) of the seal ring 1 can be determined depending on configurations of the shaft and the housing on which the seal ring 1 is mounted. An outer diameter of the seal ring 1 can be 10 mm or more and 200 mm or less, for example. The thickness $t_0$ of the seal ring 1 can be 0.8 mm or more and 3.5 mm or less, for example.

Material of the seal ring 1 is not limited to a particular kind. For example, polyether ether ketone (PEEK), polyphenylene sulfide (PPS), polyimide (PI), polytetrafluoroethylene (PTFE), modified polytetrafluoroethylene, or ethylene tetrafluoroethylene (ETFE) can be used for the material of the seal ring 1. Further, an additive such as carbon powder and carbon fibers may be mixed into the above material for the material of the seal ring 1.

A manufacturing method for the seal ring 1 is not limited to a particular method. For example, the seal ring 1 provided with the pockets 10 can be directly manufactured by injection molding or compression molding. Examples of material suitable for injection molding can include a resin such as PEEK, PPS, and PI. Examples of material suitable for compression molding can include a resin such as PTFE. Further, for example, with the resin such as PTFE, the seal ring 1 may be manufactured by forming the pockets 10 by machining after formation of the seal ring 1.

2. Configuration of Pocket 10

Figure 2:
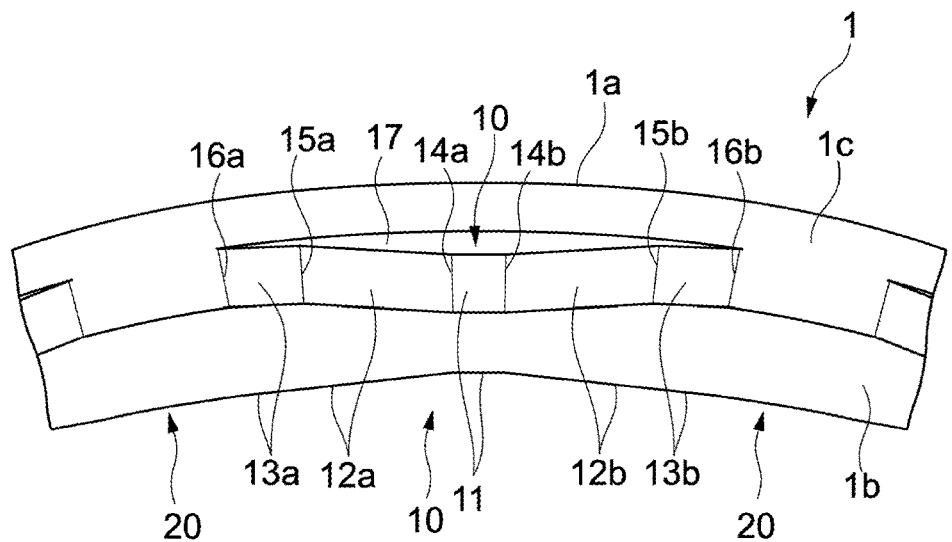
FIG. 2 A partial, perspective view of the seal ring.
Figure 3:
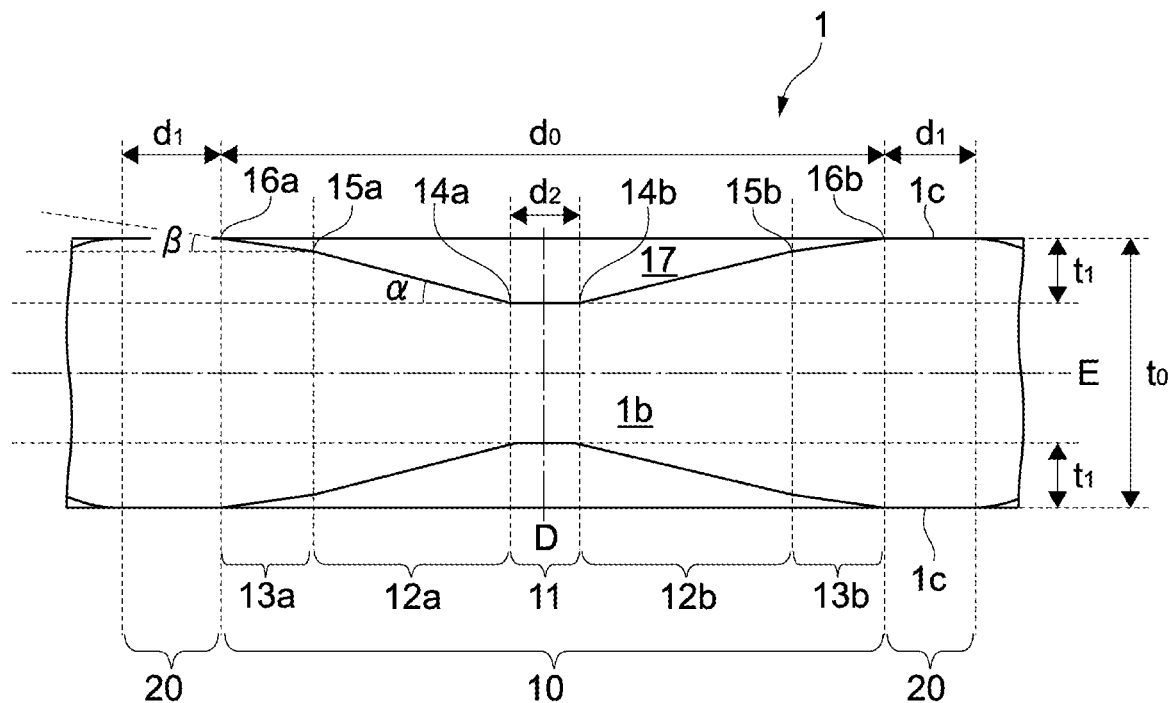
FIG. 3 A view partially showing an inner circumferential surface of the seal ring.

FIG. 2 is a partial, perspective view showing a schematic configuration of the seal ring 1 and shows the pocket 10 in an enlarged state. FIG. 3 is a view showing the pocket 10 of the seal ring 1 as viewed from the inner circumferential surface 1b. FIG. 3 shows a shape along the inner circumferential surface 1b of the seal ring 1. Dimensions $d_0$, $d_1$, and $d_2$ shown in FIG. 3 indicate dimensions in a circumferential direction of the inner circumferential surface 1b of the seal ring 1.

The pocket 10 is provided in the side surface 1c of the seal ring 1 on a side of the inner circumferential surface 1b. The pocket 10 includes a partition wall 17 between the pocket 10 and the outer circumferential surface 1a of the seal ring 1. The partition wall 17 closes a space on a side of the outer circumferential surface 1a. Therefore, in the seal ring 1, leakage of oil in the pocket 10 toward the outer circumferential surface 1a of the seal ring 1 can be reduced.

On the other hand, the pocket 10 does not include such a partition wall between the pocket 10 and the inner circumferential surface 1b and is opened to the inner circumferential surface 1b of the seal ring 1. This can prevent the oil pressure within the pocket 10 from being excessively high. Therefore, the leakage of oil in the pocket 10 toward the outer circumferential surface 1a of the seal ring 1 can be effectively reduced.

The partition wall 17 of the pocket 10 is configured as a flat surface orthogonal to the side surface 1c of the seal ring 1. However, the partition wall 17 is not limited to a particular configuration as long as it can isolate an inner space of the pocket 10 from the space on the side of the outer circumferential surface 1a.

The pockets 10 are isolated from one another in the circumferential direction of the seal ring 1 due to column portions 20 provided in the side surfaces 1c. In other words, the pockets 10 and the column portions 20 are alternately arranged in the inner circumferential surface 1b of the seal ring 1.

The dimension $d_0$ of the pocket 10 and the dimension $d_1$ of the column portion 20 can be appropriately determined depending on a diameter of the seal ring 1 and the like. The dimension $d_0$ of the pocket 10 can be 2.0 mm or more and 35 mm or less, for example. The dimension $d_1$ of the column portion 20 can be 0.1 mm or more and 5.0 mm or less, for example.

The shape of the pocket 10 is configured to be symmetrical about a plane D. The plane D extends through the central axis C and is shown by the long dashed short dashed line in FIG. 3, which is located at a center in the circumferential direction. Further, the positions and shapes of the pockets 10 in the two side surfaces 1c of the seal ring 1 are configured to be symmetrical about a plane E. The plane E is shown by the long dashed short dashed line in FIG. 3, which is located at a center in a direction of the thickness $t_0$ of the seal ring 1.

The pocket 10 includes a bottom portion 11, first inclined portions 12a, 12b, and second inclined portions 13a, 13b. The pocket 10 further includes connection portions 14a, 14b, ridge portions 15a, 15b, and circumferential end portions 16a, 16b. The above-mentioned configurations of the pocket 10 are all symmetrical about the plane D. The first inclined portion 12a and the second inclined portion 13a constitute a continuous inclined portion. The first inclined portion 12b and the second inclined portion 13b constitute a continuous inclined portion.

The bottom portion 11 is a site that is provided in a central region of the pocket 10 in the circumferential direction and a depth from the side surface 1c is largest in the pocket 10. The bottom portion 11 functions as an inflow port of oil irrespective of a direction of rotation of the seal ring 1. The bottom portion 11 is favorably configured as a continuous flat surface, and more favorably configured as a flat surface parallel to the side surface 1c. With this, oil easily flows into the pocket 10, and a sufficient inflow of oil into the pocket 10 can be ensured.

The dimension $d_2$ of the bottom portion 11 and a depth $t_1$ from the side surface 1c can be appropriately determined. The dimension $d_2$ of the bottom portion 11 can be 0.01 mm or more and 20 mm or less, for example. The depth $t_1$ of the bottom portion 11 from the side surface 1c can be 0.1 mm or more and 1.0 mm or less, for example. Further, the depth $t_1$ of the bottom portion 11 from the side surface 1c can be 50% or more and 98% or less of the thickness $t_0$ of the seal ring 1, for example.

The first inclined portions 12a, 12b are provided on both sides of the bottom portion 11 in the circumferential direction. In the example shown in FIGS. 2 and 3, the first inclined portion 12a is arranged on a right-hand side of the bottom portion 11 and the first inclined portion 12b is arranged on a left-hand side of the bottom portion 11. The first inclined portions 12a, 12b are each inclined such that the depth from the side surface 1c becomes smaller in a direction away from the bottom portion 11.

The second inclined portions 13a, 13b are each provided to the first inclined portions 12a, 12b on an opposite side of the bottom portion 11, respectively. In the example shown in FIGS. 2 and 3, the second inclined portion 13a is arranged on a left-hand side of the first inclined portion 12a and the second inclined portion 13b is arranged on a right-hand side of the first inclined portion 12b. The second inclined portions 13a, 13b are each inclined such that the depth from the side surface 1c becomes smaller in a direction away from the first inclined portion 12a, 12b.

The first inclined portions 12a, 12b and the second inclined portions 13a, 13b are favorably flat surfaces in view of easy design and working and the like. However, the first inclined portions 12a, 12b and the second inclined portions 13a, 13b may be curved surfaces or may be curved surfaces each having a convex shape or a concave shape, for example.

Each of the first inclined portions 12a, 12b forms an angle α with respect to the side surface 1c. Further, each of the second inclined portions 13a, 13b forms an angle β with respect to the side surface 1c. The angle of inclination β of the second inclined portion 13a, 13b is smaller than the angle of inclination α of the first inclined portion 12a, 12b.

The connection portion 14a, 14b connects the bottom portion 11 to the first inclined portion 12a, 12b. The connection portion 14a, 14b is favorably an R-surface having a concave shape. A radius of curvature of the connection portion 14a, 14b is determined such that oil can smoothly flow from the bottom portion 11 to the first inclined portion 12a, 12b, for example.

The connection portion 14a, 14b may be formed having a single radius of curvature or may be formed having a continuously-varying radius of curvature. A radius of curvature (radius of curvature of tip) of a part of the connection portion 14a, 14b, which has a smallest radius of curvature, only needs to be larger than 0 mm. Further, the radius of curvature of the connection portion 14a, 14b of the tip is favorably 0.5 mm or more and 100 mm or less, more favorably 0.5 mm or more and 80 mm or less, and even more favorably 1 mm or more and 60 mm or less.

Note that the configuration of the connection portion 14a, 14b is not limited to the R-surface and, for example, may be a C-face or may be a valley line at which the bottom portion 11 intersects the first inclined portion 12a, 12b.

The ridge portion 15a, 15b connects the first inclined portion 12a, 12b to the second inclined portion 13a, 13b. The ridge portion 15a, 15b is positioned shallower than the depth $t_1$ of the bottom portion 11 from the side surface 1c. The angle of inclination β of the second inclined portion 13a, 13b is smaller than the angle of inclination α of the first inclined portion 12a, 12b. Therefore, the ridge portions 15a, 15b each have a convex shape.

The ridge portion 15a, 15b is favorably an R-surface having a convex shape. The radius of curvature of the ridge portion 15a, 15b is determined such that oil can smoothly flow from the first inclined portion 12a, 12b to the second inclined portion 13a, 13b, for example.

The ridge portion 15a, 15b may be formed having a single radius of curvature or may be formed having a continuously-varying radius of curvature. A radius of curvature (radius of curvature of tip) of a part of the ridge portion 15a, 15b, which has a smallest radius of curvature, is favorably 0.5 mm or more and 100 mm or less, more favorably 0.5 mm or more and 80 mm or less, and even more favorably 1 mm or more and 60 mm or less.

Note that the configuration of the ridge portion 15a, 15b is not limited to the R-surface and, for example, may be a C-face or may be a ridge line at which the first inclined portion 12a, 12b intersects the second inclined portion 13a, 13b.

The circumferential end portions 16a, 16b are arranged at both end portions of the pocket 10 in the circumferential direction. The circumferential end portions 16a, 16b connect the second inclined portions 13a, 13b to the side surface 1c corresponding to the column portions 20. The circumferential end portion 16a, 16b is configured as a R-surface having a convex shape. The circumferential end portions 16a, 16b will be described later in detail.

In the seal ring 1, all the pockets 10 of the both side surfaces 1c are favorably configured to be symmetrical about the plane E. With this, the strength of the seal ring 1 increases and the seal ring 1 is hardly deformed. Therefore, in the seal ring 1, various types of performance such as a sealing property are well maintained.

Figure 4:
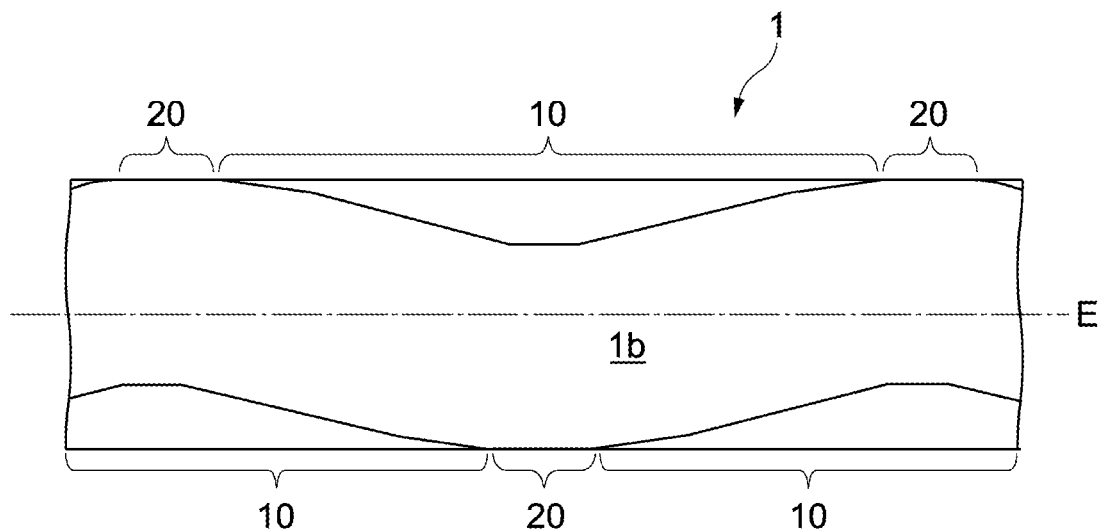
FIG. 4 A view partially showing an inner circumferential surface of a modified example of the seal ring.

However, depending on needs, the seal ring 1 may be arranged such that the pockets 10 of one of the both side surfaces 1c are deviated from the pockets 10 of the other in the circumferential direction, as shown in FIG. 4. Even with the seal ring 1 shown in FIG. 4, the actions of the pockets 10 similar to those of the seal ring 1 shown in FIG. 3 can be obtained. An amount of deviation of the pockets 10 in the both side surfaces 1c in the circumferential direction can be arbitrarily determined.

Further, in the seal ring 1, the both side surfaces 1c are favorably provided with the pockets 10. With this, the actions of the pockets 10 can be obtained irrespective of which of the side surfaces 1c is a seal surface in the seal ring 1. Therefore, in the seal ring 1 with the both side surfaces 1c provided with the pockets 10, it is unnecessary to take care of the direction of mounting on the shaft, and hence the work efficiency is improved.

However, depending on needs, only one of the two side surfaces 1c of the seal ring 1 may be provided with the pockets 10.

3. Action and Effect of Pocket 10

3.1 Oil Pressure within Pocket 10

Figure 5A:
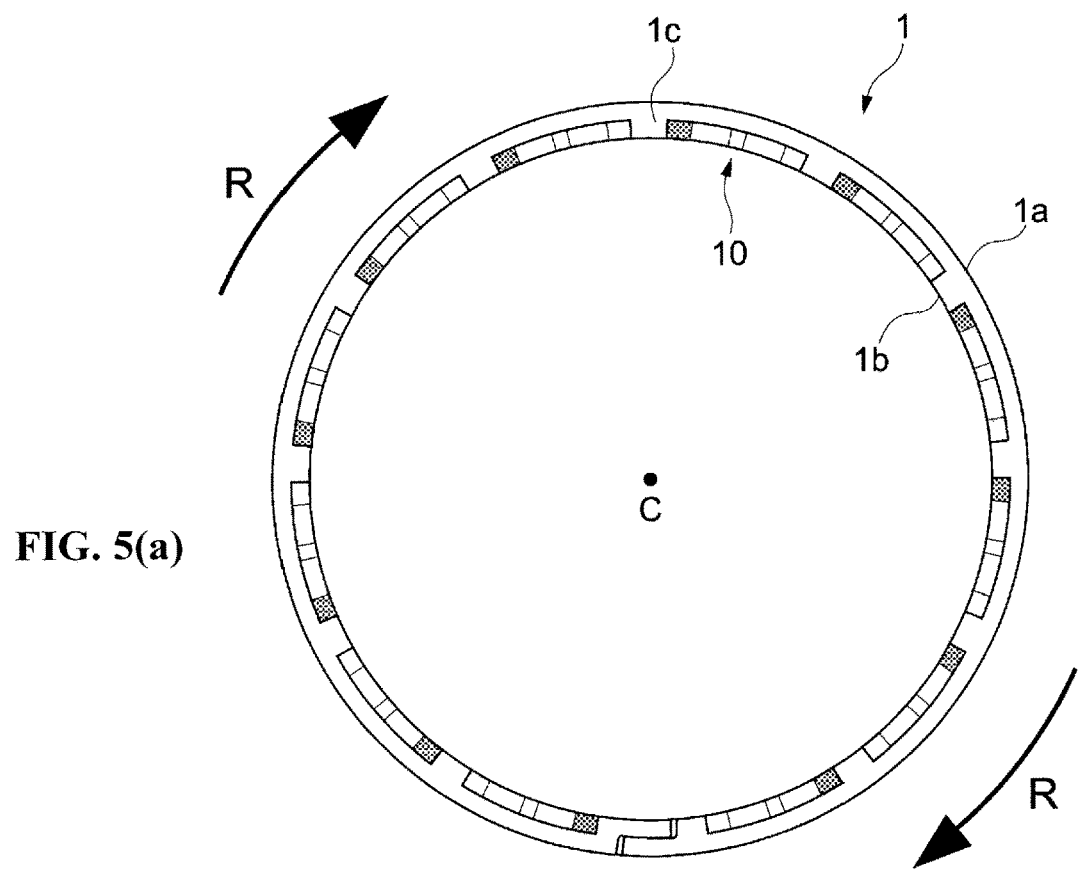
FIGS. 5(a)-5(b) Plan views showing sites that receive oil pressure during rotation of the seal ring.
Figure 5B:
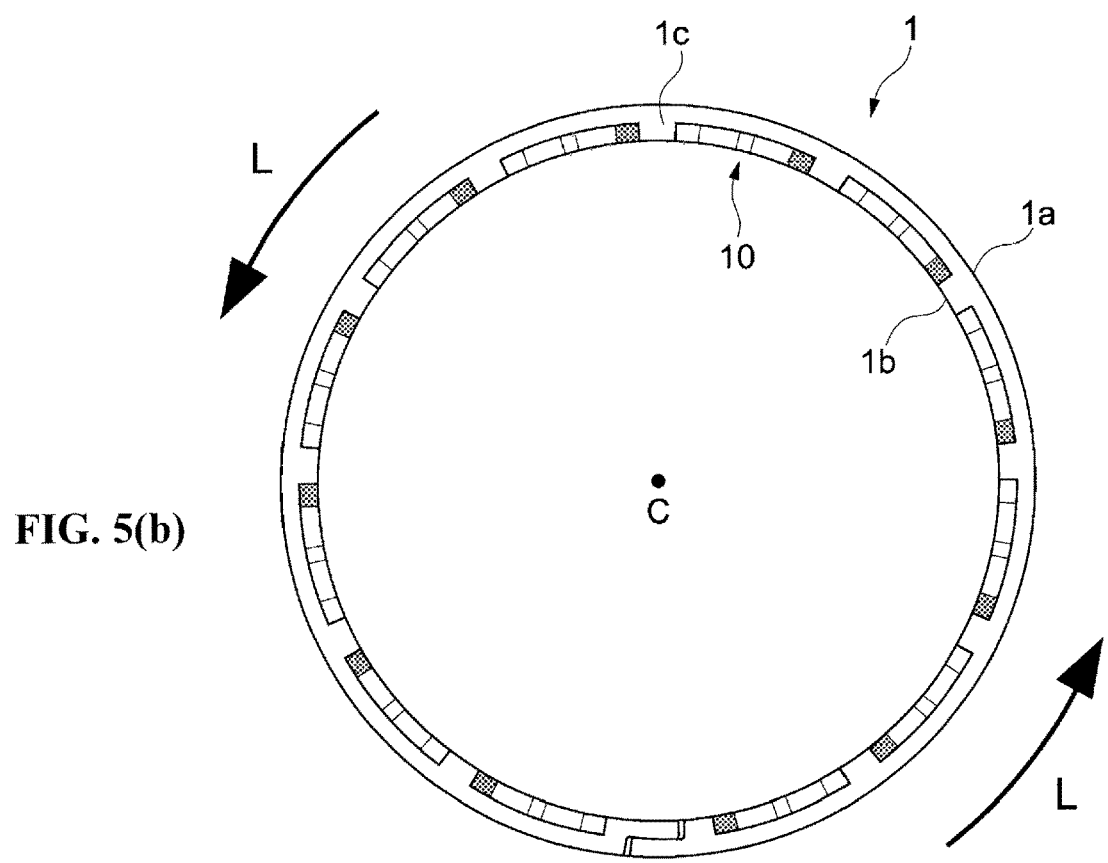

FIGS. 5(a) and 5(b) show sites that receive high oil pressure during rotation of the seal ring 1 by hatching. FIG. 5(a) shows rightward rotation in a direction of the arrow R and FIG. 5(b) shows leftward rotation in a direction of the arrow L.

Note that it is assumed that the rotation of the seal ring 1 means rotation relative to the shaft in this embodiment. Therefore, the direction of rotation of the seal ring 1 is a direction of rotation with respect to the shaft.

In the seal ring 1 rotating in the direction of the arrow R shown in FIG. 5(a), the second inclined portion 13a of each pocket 10, which is on a rear side in the direction of the arrow R, receives high oil pressure. In the seal ring 1 rotating the direction of the arrow L shown in FIG. 5(b), the second inclined portion 13b of each pocket 10, which is on a rear side in the direction of the arrow L, receives high oil pressure.

In the seal ring 1, one of the second inclined portions 13a, 13b receives high oil pressure, depending on the direction of rotation as described above. In this manner, canceling pressure to weaken pressure applied on the groove of the shaft from the side surface 1c is obtained. With this, in the seal ring 1, the friction between the seal ring 1 and the shaft is well reduced and the friction loss is effectively reduced.

In the seal ring 1, the friction loss between the seal ring 1 and the shaft is more effectively reduced due to the actions of the first inclined portions 12a, 12b and the second inclined portions 13a, 13b. Hereinafter, the actions of the first inclined portions 12a, 12b and the second inclined portions 13a, 13b will be described with reference to FIGS. 2 and 3.

3.2 First Inclined Portions 12a, 12b and Second Inclined Portions 13a, 13b

In the seal ring 1, the first inclined portions 12a, 12b mainly function to take oil in the pockets 10 and smoothly feed the oil taken in the pockets 10 to the second inclined portions 13a, 13b.

The angle of inclination α of the first inclined portion 12a, 12b is larger than the angle of inclination β of the second inclined portion 13a, 13b. Therefore, the pocket 10 is widely opened to the inner circumferential surface 1b at the first inclined portions 12a, 12b. Therefore, oil easily enters the pocket 10. Therefore, an inflow amount of oil into the pocket 10 increases.

Further, the first inclined portions 12a, 12b and the second inclined portions 13a, 13b are the same in direction of inclination, respectively. Therefore, oil can smoothly flow from the first inclined portions 12a, 12b to the second inclined portions 13a, 13b. Due to such configurations of the first inclined portions 12a, 12b, an amount of oil flowing into the second inclined portions 13a, 13b increases. Therefore, high oil pressure is applied to the second inclined portions 13a, 13b.

The second inclined portions 13a, 13b mainly function to utilize oil pressure from oil as canceling pressure to weaken pressure applied on the groove of the shaft from the side surface 1c of the seal ring 1, for reducing the friction loss of the seal ring 1.

In the second inclined portions 13a, 13b, wedge-shaped oil channels are formed. Further, the angle of inclination β of the second inclined portion 13a, 13b is smaller than the angle of inclination α of the first inclined portion 12a, 12b. Therefore, where oil flows into the second inclined portions 13a, 13b from the first inclined portions 12a, 12b, the reduction of the opening of the oil channel becomes gentle. With this, oil easily flows deeply into the second inclined portions 13a, 13b without escaping to the inner circumferential surface 1b of the seal ring 1. Therefore, the oil pressure applied on the second inclined portions 13a, 13b increases.

Further, the angle β of the second inclined portion 13a, 13b with respect to the side surface 1c is relatively small. Therefore, a component of force applied on the second inclined portion 13a, 13b from oil, which is perpendicular to the side surface 1c, becomes large. Therefore, the oil pressure within the second inclined portions 13a, 13b acts as canceling pressure to more efficiently weaken pressure applied on the groove of the shaft from the seal ring 1. With this, in the seal ring 1, the friction between the seal ring 1 and the shaft is effectively reduced. Therefore, the friction loss between the seal ring 1 and the shaft is further reduced.

Specific numerical values of the angles α and β can be appropriately determined in a manner that depends on applications, usage environment, and the like of the seal ring 1. The angle α is favorably 2° or more and 85° or less, more favorably 2° or more and 60° or less, and even more favorably 5° or more and 45° or less. Further, the angle β is favorably 1° or more and 20° or less, more favorably 1° or more and 15° or less, and even more favorably 1° or more and 10° or less.

3.3 Circumferential End Portions 16a, 16b

The circumferential end portions 16a, 16b mainly function to form an adequate oil film on the side surface 1c corresponding to the column portions 20.

As described above, the circumferential end portion 16a, 16b is R-surface having a convex shape. Therefore, the angle of the circumferential end portion 16a, 16b with respect to the side surface 1c gradually become smaller from the second inclined portion 13a, 13b toward the column portion 20. That is, regarding an oil channel formed by the circumferential end portions 16a, 16b, the reduction of the opening becomes smaller as it becomes narrower.

This makes it easy for oil passing the second inclined portions 13a, 13b to flow deeply into the circumferential end portions 16a, 16b without escaping to the inner circumferential surface 1b. In the seal ring 1, oil passing the circumferential end portions 16a, 16b forms an adequate oil film on the side surface 1c corresponding to the column portions 20. With this, the friction loss of the seal ring 1 is effectively reduced.

Here, if the oil film formed on the side surface 1c corresponding to the column portions 20 is too thin, the effect of reducing the friction loss in the seal ring 1 may not be sufficiently obtained. Conversely, if the oil film formed on the side surface 1c corresponding to the column portions 20 is too thick, oil leakage toward the outer circumferential surface 1a of the seal ring 1 may increase.

Therefore, in the seal ring 1, it is favorable that the respective configurations of the pockets 10 including the circumferential end portions 16a, 16b, the first inclined portions 12a, 12b, the second inclined portions 13a, 13b, and the like are designed such that the oil film on the side surface 1c corresponding to the column portions 20 has a suitable thickness.

Note that the circumferential end portion 16a, 16b may be formed having a single radius of curvature or may be formed having a continuously-varying radius of curvature. A radius of curvature (radius of curvature of tip) of a part of the circumferential end portion 16a, 16b, which has a smallest radius of curvature, only needs to be larger than 0 mm. Further, the radius of curvature of the tip of the circumferential end portion 16a, 16b is favorably 0.5 mm or more and 100 mm or less, more favorably 0.5 mm or more and 80 mm or less, and even more favorably 1 mm or more and 60 mm or less.

3.4 Number of Pockets 10

In the seal ring 1, even if the circumferential dimension $d_0$ of the pocket 10 is reduced, the inflow amount of oil into the pocket 10 can be maintained by increasing the angle of inclination α of the first inclined portion 12a, 12b to increase the depth $t_1$ of the pocket 10. With this, canceling pressure that can be obtained per pocket 10 can also be maintained.

On the other hand, a larger number of pockets 10 can be arranged in the seal ring 1 if the circumferential dimension $d_0$ of the pocket 10 is reduced. By thus increasing the number of pockets 10 in the seal ring 1, canceling pressure received by the seal ring 1 as a whole can be increased. With this, the friction loss in the seal ring 1 is more effectively reduced.

Further, by increasing the number of pockets 10 in the seal ring 1, it is possible to narrow intervals of sites that receive high oil pressure, that is, narrow a range of sites that do not receive high oil pressure. With this, the seal ring 1 as a whole can stably obtain canceling pressure to weaken pressure applied on the groove of the shaft from the seal ring 1, from oil within the pockets 10.

From the above-mentioned perspective, it is favorable to set the number of pockets 10 in each side surface 1c to eight or more in the seal ring 1.

Further, in order to effectively reduce the friction loss in the seal ring 1, it is favorable that the sum of the circumferential dimensions $d_0$ of the pockets 10 is 50% or more of an entire circumference of the inner circumferential surface 1b. On the other hand, in order to keep the functions of the pockets 10 normal by using the column portions 20 in the seal ring 1, it is favorable that the sum of the circumferential dimensions $d_0$ of the pockets 10 is 98% or less of the entire circumference of the inner circumferential surface 1b.

4. Examples 4.1 Example According to Seal Ring 1

The seal ring 1 having the configuration of the above-mentioned embodiment was fabricated as Example of the present invention. The outer diameter of the seal ring 1 was set to 51 mm and the number of pockets 10 is set to 12. Note that configurations of seal rings 101, 201, 301, and 401 according to Comparative Examples 1 to 4 to be described later are similar to those of the seal ring 1 according to this Example, excluding configurations to be specially described.

4.2 Seal Ring 101 According to Comparative Example 1

Figure 6A:
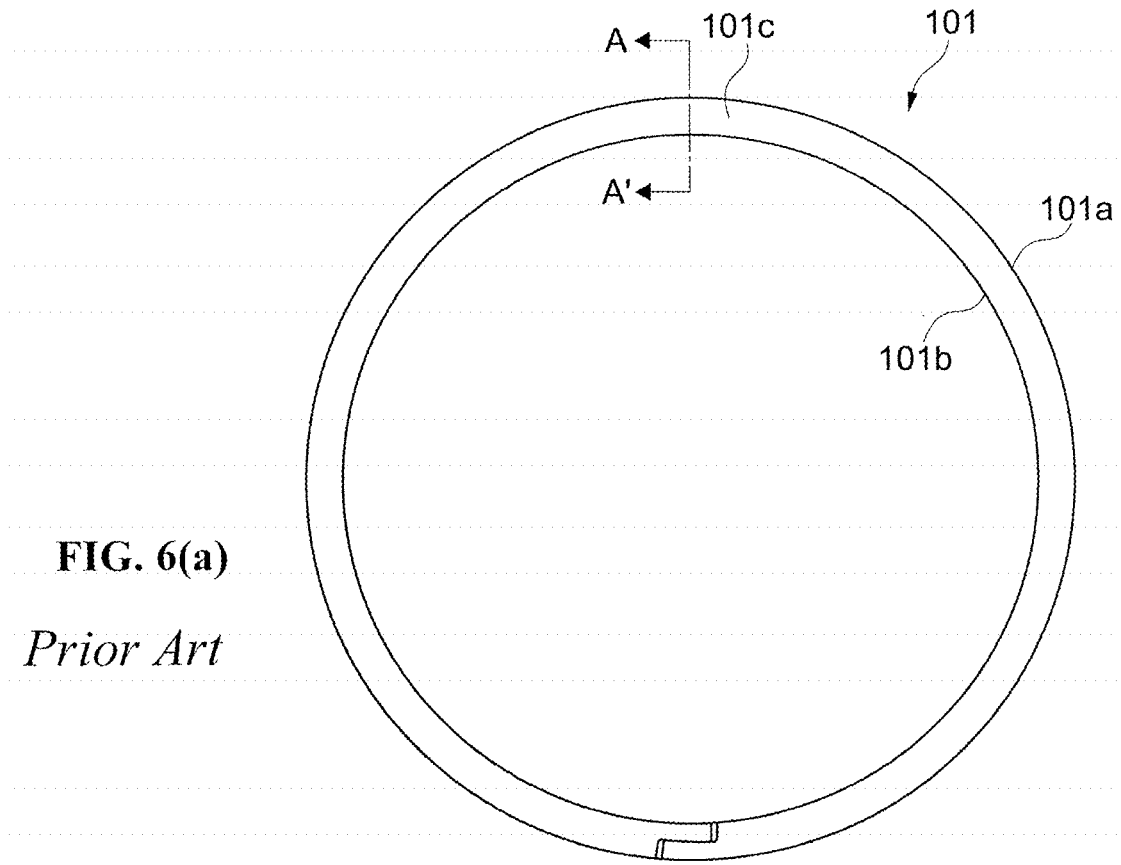
FIGS. 6(a)-6(b) Views showing a seal ring according to Comparative Example 1.
Figure 6B:
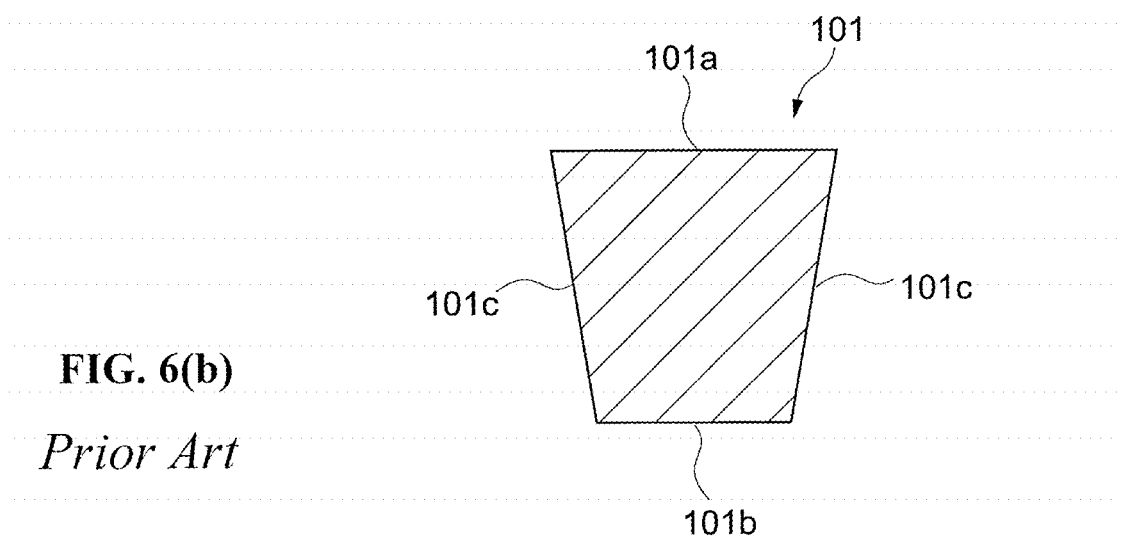

FIGS. 6(*a*) and 6(*b*) are views showing the seal ring 101 according to Comparative Example 1 of the present invention. FIG. 6(*a*) is a plan view of the seal ring 101 and FIG. 6(*b*) is a cross-sectional view of the seal ring 101, which is taken along the line A-A' of FIG. 6(*a*).

In the seal ring 101, side surfaces 101*c* are inclined such that a distance therebetween becomes narrower from the outer circumferential surface 101*a* to the inner circumferential surface 101*b*. In the seal ring 101, a reduction in the friction loss is achieved by employing a configuration in which the side surface 101*c* and the groove of the shaft are not in surface contact with each other.

4.3 Seal Ring 201 According to Comparative Example 2

Figure 7A:
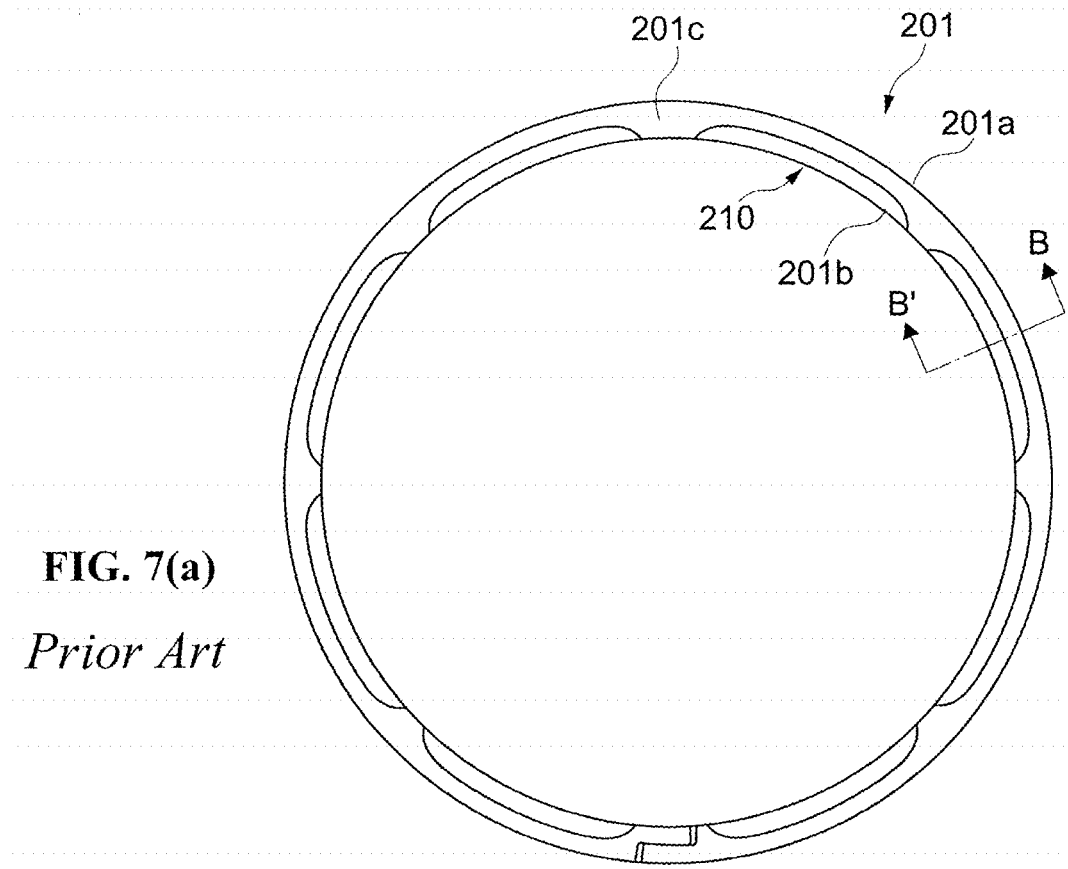
FIGS. 7(a)-7(b) Views showing a seal ring according to Comparative Example 2.
Figure 7B:
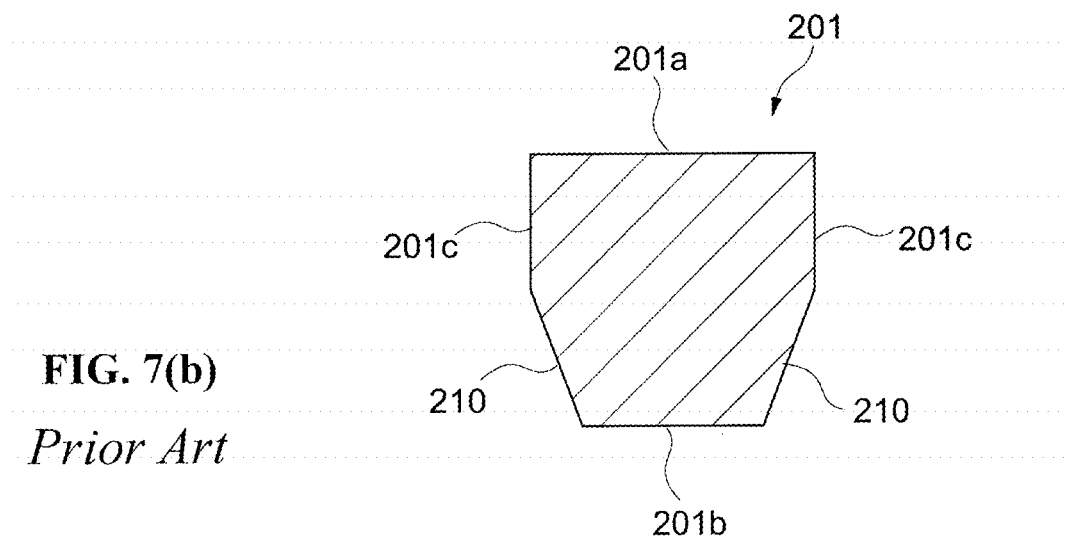

FIGS. 7(*a*) and 7(*b*) are views showing the seal ring 201 according to Comparative Example 2 of the present invention. FIG. 7(*a*) is a plan view of the seal ring 201 and FIG. 7(*b*) is a cross-sectional view of the seal ring 201, which is taken along the line B-B' of FIG. 7(*a*).

The seal ring 201 is provided with eight pockets 210. Unlike the pocket 10 of the seal ring 1 according to Example, the pocket 210 has inclined surfaces. An inner circumferential surface 201*b* is connected to side surfaces 201*c* through the inclined surfaces, respectively. In the seal ring 201, a reduction in the friction loss due to the pockets 210 is achieved while keeping surface contact between the side surface 201*c* and the groove of the shaft.

4.4 Seal Ring 301 According to Comparative Example 3

Figure 8A:
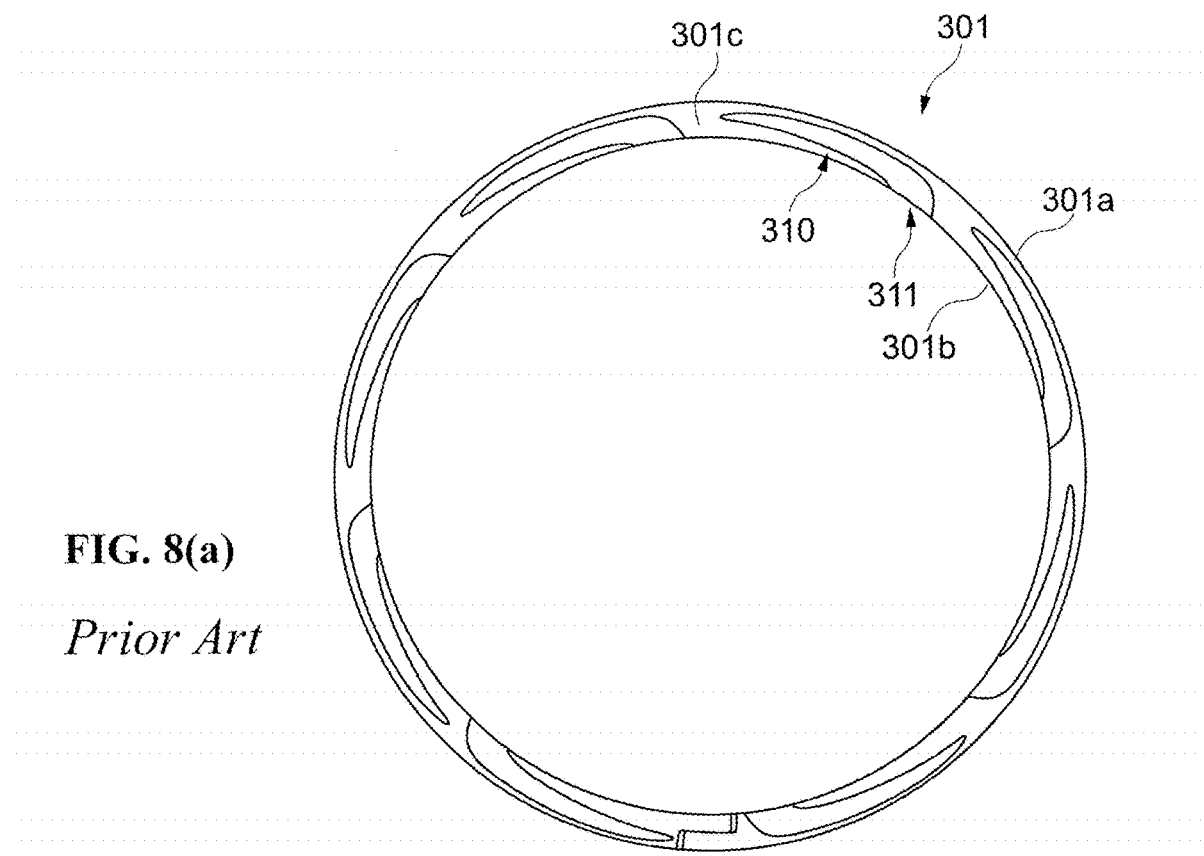
FIGS. 8(a)-8(b) Views showing a seal ring according to Comparative Example 3.
Figure 8B:
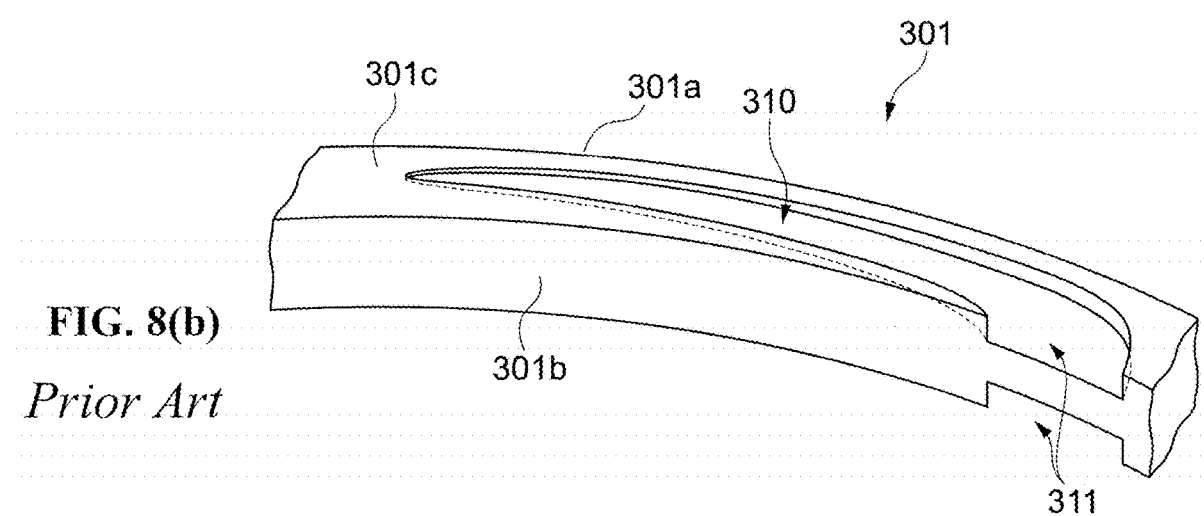

FIGS. 8(*a*) and 8(*b*) are views showing the seal ring 301 according to Comparative Example 3 of the present invention. FIG. 8(*a*) is a plan view of the seal ring 301 and FIG. 8(*b*) is a partial, perspective view showing one of pockets 310 of the seal ring 301 in an enlarged state.

The pocket 310 provided in the seal ring 301 extends from an inflow port 311 provided in an inner circumferential surface 301*b*, along a region between an outer circumferential surface 301*a* and the inner circumferential surface 301*b*. The pocket 310 is configured such that a width and a depth from a side surface 301*c* become smaller in a direction away from the inflow port 311.

The seal ring 301 is configured such that oil flowing into the pocket 310 from the inflow port 311 does not flow out to the inner circumferential surface 301*b* while the opening of an oil channel is made smaller. The seal ring 301 has a configuration specialized for reducing the friction loss due to the increased oil pressure within the pocket 310.

4,5 Seal Ring 401 According to Comparative Example 4

Figure 9A:
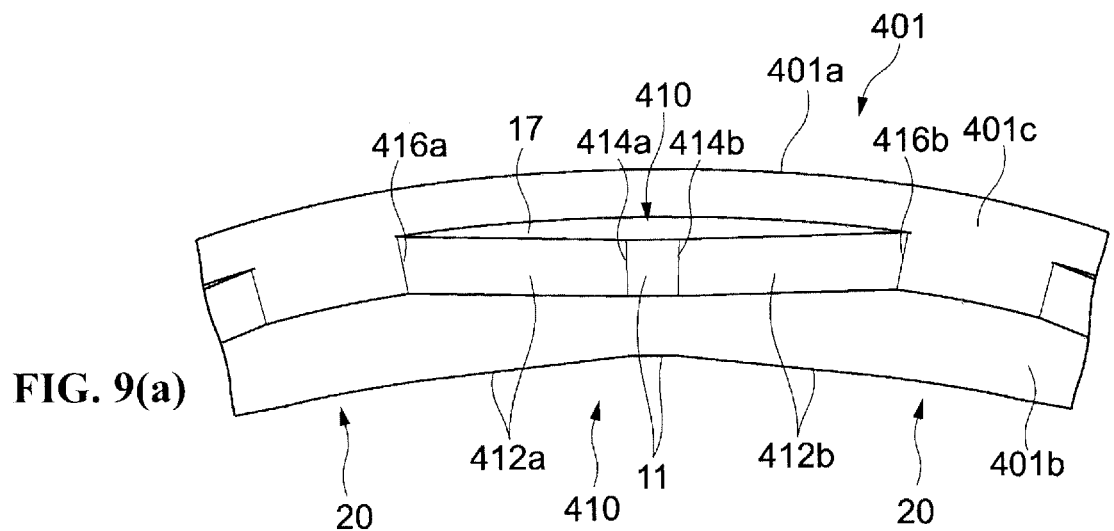
FIGS. 9(a)-9(b) Views showing a seal ring according to Comparative Example 4.
Figure 9B:
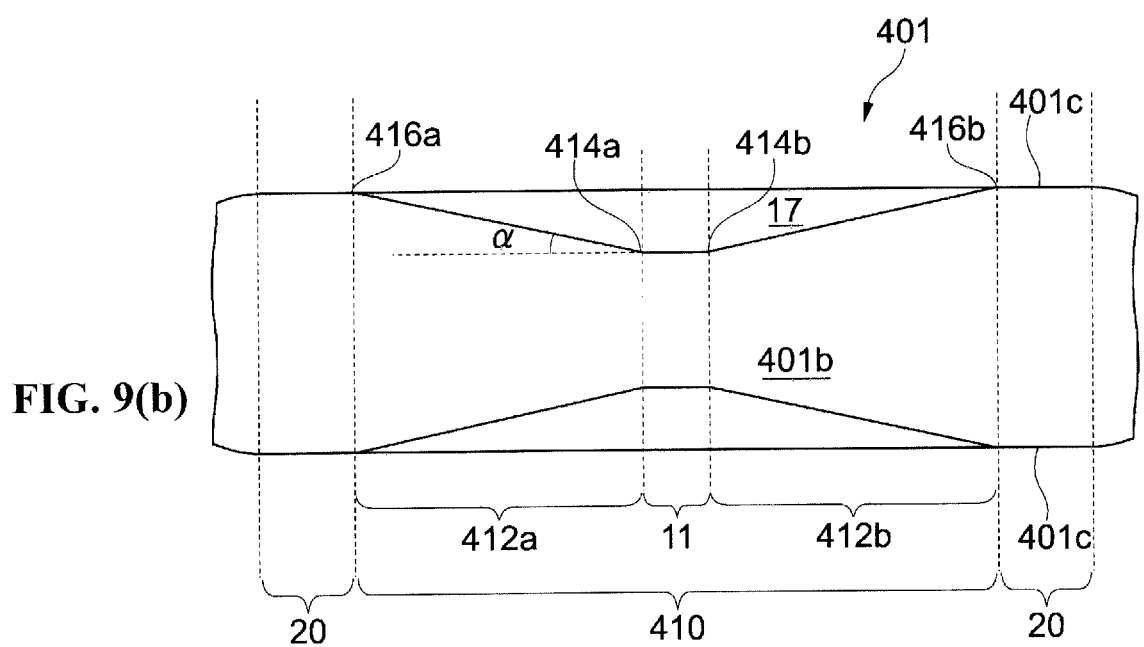

FIG. 9 is a view showing the seal ring 401 according to Comparative Example 4, which is from International Patent Application Publication No. WO2016/158848. (A) of FIG. 9 is a partial, perspective view of the seal ring 401 and (B) of FIG. 9 is a view partially showing an inner circumferential surface 401*b* of the seal ring 401.

Pockets 410 of the seal ring 401 according to Modified Example 4 are common to the pockets 10 of the seal ring 1 according to the above-mentioned embodiment in that the pockets 410 of the seal ring 401 according to Modified Example 4 include the bottom portions 11 and are formed to be symmetrical in the circumferential direction. However, the pocket 410 of the seal ring 401 according to Modified Example 4 does not include the inclined portions having the two-step configuration unlike the pocket 10 of the seal ring 1 according to the above-mentioned embodiment.

Specifically, in the seal ring 401, the bottom portion 11 is connected to a circumferential end portion 416*a*, 416*b* through a single inclined portion 412*a*, 412*b*. The inclined portion 412*a*, 412*b* of the seal ring 401 according to Modified Example 4 forms an angle α with respect to a side surface 401*c* as in the first inclined portion 12*a*, 12*b* of the seal ring 1 according to the above-mentioned embodiment.

The seal ring 401 receives high oil pressure at a tip end portion of the inclined portions 412*a*, 412*b*. Then, oil passing the circumferential end portion 416*a*, 416*b* that is an R-surface having a convex shape forms an oil film in the column portion 20. In this manner, in the seal ring 401, a reduction in friction loss is achieved by the inclined portions 412*a*, 412*b* and the circumferential end portions 416*a*, 416*b*.

4.6 Friction-Loss Evaluation

Friction-loss evaluation using the seal ring 1 according to Example, the seal ring 101 according to Comparative Example 1, the seal ring 201 according to Comparative Example 2, the seal ring 301 according to Comparative Example 3, and the seal ring 401 according to Comparative Example 4 as samples was conducted. For the friction-loss evaluation, measurement for drag torque (N*m) using two of those samples and setting the temperature of oil to 80° C. and the oil pressure to 0.5 MPa was conducted. The rotations per minute of each sample in the measurement of drag torque was set to 1000 to 6000 rpm.

Figure 10:
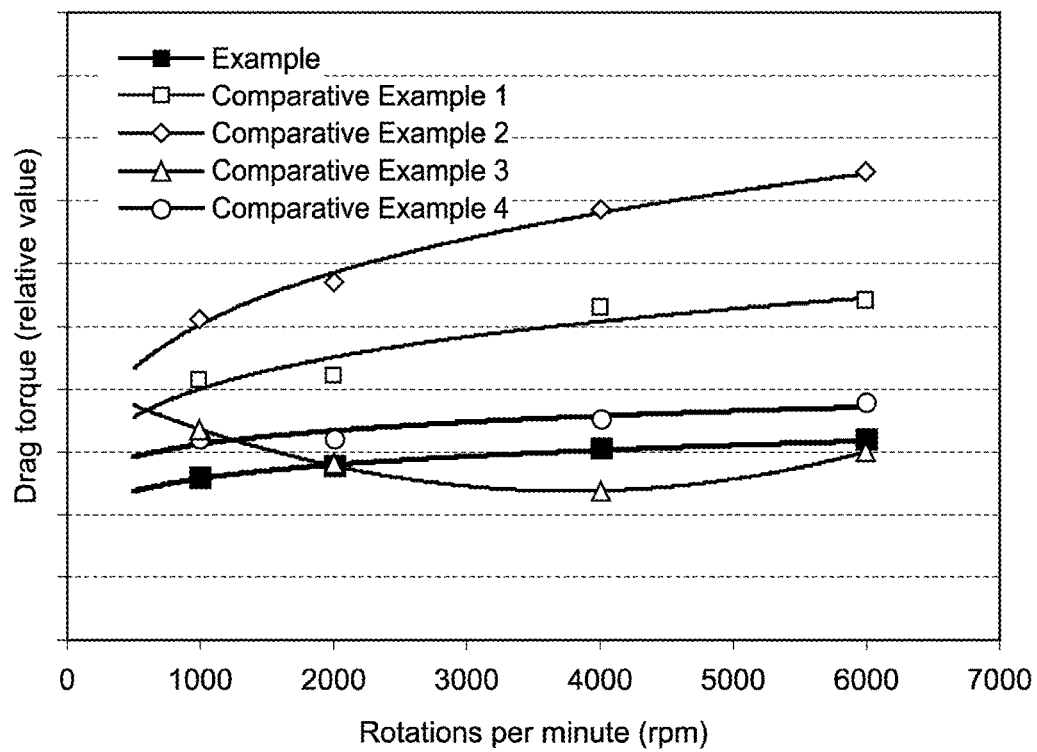
FIG. 10 A graph showing results of friction-loss evaluation.

FIG. 10 is a graph showing measurement results of drag torque. The horizontal axis of FIG. 10 represents rotations per minute (rpm) and the vertical axis represents a relative value of the drag torque.

In all of the seal ring 1 according to Example, the seal ring 101 according to Comparative Example 1, the seal ring 201 according to Comparative Example 2, the seal ring 301 according to Comparative Example 3, and the seal ring 401 according to Comparative Example 4, low drag torque was obtained and the friction loss was reduced.

In the seal ring 1 according to Example and the seal ring 301 according to Comparative Example 3 among them, it was found that significantly low drag torque was obtained and the friction loss was more effectively reduced.

Further, comparing the seal ring 1 according to Example with the seal ring 401 according to Comparative Example 4, lower drag torque was obtained in the seal ring 1 according to Example at any rotations per minute. With this, it was found that the friction loss is more effectively reduced by providing the pockets 10 with the second inclined portions 13*a*, 13*b*.

4.7 Oil-Leakage Evaluation

Oil-leakage evaluation using the seal ring 1 according to Example, the seal ring 101 according to Comparative Example 1, the seal ring 201 according to Comparative Example 2, the seal ring 301 according to Comparative Example 3, and the seal ring 401 according to Comparative Example 4 as samples was conducted. For the oil-leakage evaluation, measurement of an amount of oil leakage (ml/min) using two of those samples and setting the temperature of oil to 80° C. and the oil pressure to 0.5 MPa was conducted. The rotations per minute of each sample in the measurement of an amount of oil leakage was set to 1000 to 6000 rpm.

Figure 11:
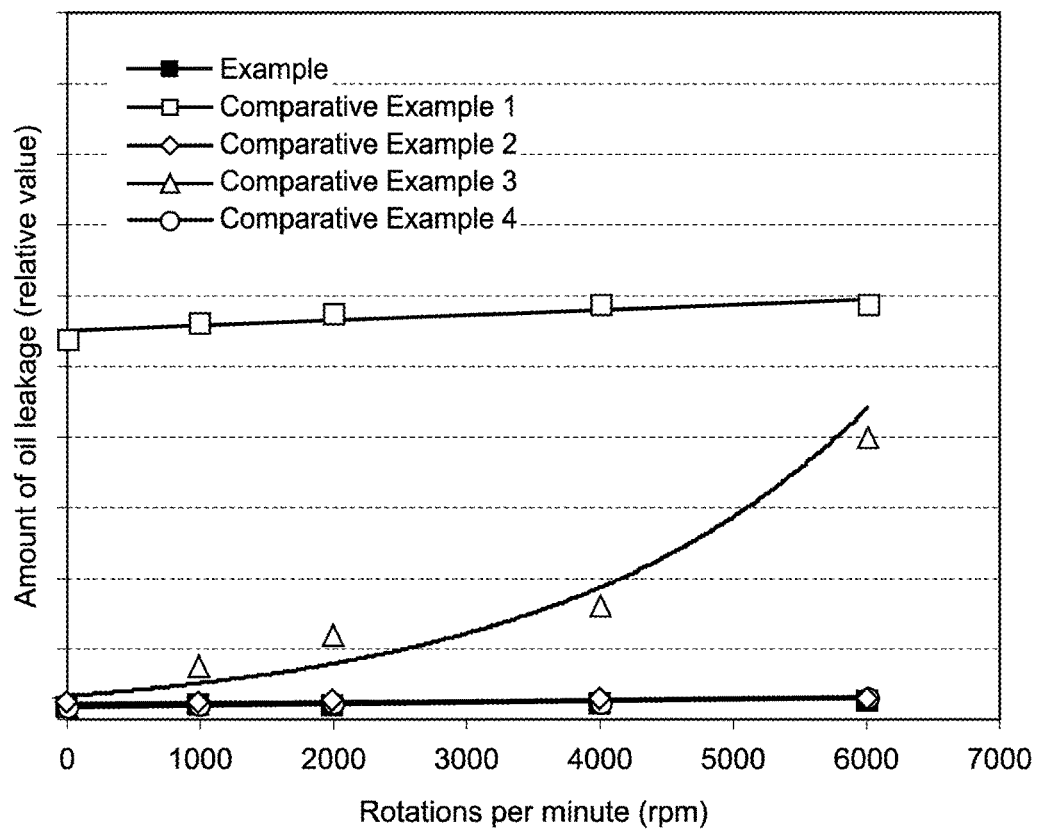
FIG. 11 A graph showing results of oil-leakage evaluation.

FIG. 11 is a graph showing measurement results of the amount of oil leakage. The horizontal axis of FIG. 11 represents rotations per minute (rpm) and the vertical axis represents a relative value of the amount of oil leakage.

In all of the seal ring 1 according to Example, the seal ring 101 according to Comparative Example 1, the seal ring 201 according to Comparative Example 2, the seal ring 301 according to Comparative Example 3, and the seal ring 401 according to Comparative Example 4, the amount of oil leakage was small and the oil leakage was reduced.

In the seal ring 1 according to Example, the seal ring 201 according to Comparative Example 2, and the seal ring 401 according to Comparative Example 4 among them, it was found that almost no oil leakage occurred irrespective of the rotations per minute and the oil leakage was more effectively reduced. On the other hand, in the seal ring 301 according to Comparative Example 3, a favorable result was obtained at low rotations per minute, though it was inferior to the seal ring 1 according to Example particularly at high rotations per minute.

Further, a difference in the amount of oil leakage between the seal ring 1 according to Example and the seal ring 401 according to Comparative Example 4 was not found. With this, it was found that the amount of oil leakage is not affected even by providing the pockets 10 with the second inclined portions 13a, 13b.

4.8 Conclusions

In the seal ring 1 according to Example, more favorable results were obtained as compared to the seal ring 101 according to Comparative Example 1 with regard to both of the friction-loss evaluation and the oil-leakage evaluation.

Further, in the seal ring 1 according to Example, a result comparable to the seal ring 201 according to Comparative Example 2 was obtained with regard to the oil-leakage evaluation and a more favorable result was obtained as compared to the seal ring 201 according to Comparative Example 2 with regard to the friction-loss evaluation.

Moreover, in the seal ring 1 according to Example, a result comparable to the seal ring 301 according to Comparative Example 3 was obtained with regard to the friction-loss evaluation and a more favorable result was obtained as compared to the seal ring 301 according to Comparative Example 3 with regard to the oil-leakage evaluation.

In addition, in the seal ring 1 according to Example, a result comparable to the seal ring 401 according to Comparative Example 4 was obtained with regard to the oil-leakage evaluation and a more favorable result was obtained as compared to the seal ring 401 according to Comparative Example 4 with regard to the friction-loss evaluation.

As described above, in the seal ring 1 according to Example of the present invention, particularly favorable results were obtained with regard to both of the friction-loss evaluation and the oil-leakage evaluation. Consequently, the seal ring 1 is capable of both reducing the friction loss and reducing the oil leakage.

5. Other Embodiments

Hereinabove, the embodiment of the present invention has been described. The present invention is not limited to the above embodiment but can be variously modified without departing from the gist of the present invention as a matter of course.

As an example, in the present invention, the configuration in which the two side surfaces of the seal ring are provided with the pockets having similar configurations is not essential. For example, the two side surfaces of the seal ring may be provided with pockets having different configurations. Moreover, the number of pockets of the two side surfaces of the seal ring may be different.

Further, in the present invention, the configuration of the inclined portion of the seal ring are not limited to the two-step configuration, and may be a configuration having three or more steps in a manner that depends on needs. In any cases, the angle of inclination β of the second inclined portion adjacent to the circumferential end portion is set to be smaller than the angle of inclination α of the first inclined portion adjacent to the bottom surface portion. Also in those cases, the effects of the present invention that oil easily enters the pockets through the first inclined portions and high oil pressure is applied on the second inclined portions can be obtained.

For example, the inclined portion may include a third inclined portion between the first inclined portion and the second inclined portion. In this case, an angle of inclination γ of the third inclined portion may be smaller than the angle of inclination α of the first inclined portion and larger than the angle of inclination β of the second inclined portion. In this case, in the inclined portions, there are formed a first ridge portion that connects the first inclined portion to the third inclined portion and a second ridge portion that connects the second inclined portion to the third inclined portion. In this configuration, the angle of inclination becomes smaller in the order of the first inclined portion, the third inclined portion, and the second inclined portion, that is, in the order that oil enters. Thus, oil flows within the pocket, more smoothly.

REFERENCE SIGNS LIST 1 seal ring
1a outer circumferential surface
1b inner circumferential surface
1c side surface
10 pocket
11 bottom portion
12a, 12b first inclined portion
13a, 13b second inclined portion
14a, 14b connection portion
15a, 15b ridge portion
16a, 16b circumferential end portion
17 partition wall
20 column portion
30 joint portion

The invention claimed is:

1. A seal ring comprising: an inner circumferential surface; an outer circumferential surface facing the inner circumferential surface; side surfaces orthogonal to the inner circumferential surface and the outer circumferential surface; and a plurality of pockets provided, spaced apart from one another in one of the side surfaces, wherein
the plurality of pockets each have a symmetrical shape in a circumferential direction of the seal ring and are entirely opened on a side of the inner circumferential surface and closed on a side of the outer circumferential surface,
the plurality of pockets each including circumferential end portions that are provided in end portions in the circumferential direction and are R-surfaces each having a convex shape connected to the side surface, a bottom portion provided in a central region in the circumferential direction, and inclined portions each extending between each of the circumferential end portions and the bottom portion,
the inclined portions each include at least one ridge portion, a first inclined portion extending between the bottom portion and the ridge portion and being a flat surface forming a first angle of 60° or less with respect to the side surface, and a second inclined portion extending between the circumferential end portion and the ridge portion and being a flat surface forming a second angle smaller than the first angle with respect to the side surface, wherein the bottom portion is a flat surface.

2. The seal ring according to claim 1, wherein the inclined portions each include the single ridge portion, and the first inclined portion and the second inclined portion are connected to each other through the ridge portion.

3. The seal ring according to claim 1, wherein the ridge portion is configured as an R-surface having a convex shape.

4. The seal ring according to claim 1, wherein the plurality of pockets each further include a connection portion that is an R-surface having a concave shape that connects the bottom portion to the first inclined portion.

5. The seal ring according to claim 1, wherein the bottom portion is parallel to the side surface.

6. The seal ring according to claim 1, wherein the plurality of pockets are provided in both the side surfaces.

7. The seal ring according to claim 6, wherein the plurality of pockets are formed to be mutually symmetrical in one of the side surfaces and the other side surface.

\* \* \* \* \*